(12) United States Patent
Onderisin et al.

(10) Patent No.: US 9,240,131 B2
(45) Date of Patent: Jan. 19, 2016

(54) ADHESIVE ARTICLES HAVING REPOSITIONABILITY OR SLIDABILITY CHARACTERISTICS

(75) Inventors: Michael Richard Onderisin, Concord Township, OH (US); Robert William Schneider, Chardon, OH (US)

(73) Assignee: Avery Dennison Corporation, Glendale, CA (US)

( * ) Notice: Subject to any disclaimer, the term of this patent is extended or adjusted under 35 U.S.C. 154(b) by 27 days.

(21) Appl. No.: 11/757,535

(22) Filed: Jun. 4, 2007

(65) Prior Publication Data
US 2008/0299346 A1 Dec. 4, 2008

(51) Int. Cl.
| | | |
|---|---|---|
| *B32B 9/00* | (2006.01) | |
| *B05D 5/10* | (2006.01) | |
| *B29C 59/00* | (2006.01) | |
| *G09F 3/10* | (2006.01) | |
| *B31D 1/02* | (2006.01) | |

(52) U.S. Cl.
CPC *G09F 3/10* (2013.01); *B31D 1/027* (2013.01); *B31F 2201/0733* (2013.01); *Y10T 428/14* (2015.01); *Y10T 428/1476* (2015.01); *Y10T 428/24802* (2015.01)

(58) Field of Classification Search
CPC ... B31D 1/027; G09F 3/10; B31F 2201/0733; Y10T 428/24802; Y10T 428/1476; Y10T 428/14
See application file for complete search history.

(56) References Cited

U.S. PATENT DOCUMENTS

| | | |
|---|---|---|
| 2,191,704 A | 2/1940 | Bennett |
| 3,301,741 A | 1/1967 | Henrickson et al. |
| 3,314,838 A | 4/1967 | Erwin |
| 3,331,729 A | 7/1967 | Danielson et al. |
| 3,386,846 A | 6/1968 | Lones |
| 3,413,168 A | 11/1968 | Danielson et al. |

(Continued)

FOREIGN PATENT DOCUMENTS

| | | |
|---|---|---|
| DE | 3417746 | 5/1984 |
| EP | 0279579 | 8/1988 |

(Continued)

OTHER PUBLICATIONS

Webpage for carbon atom: http://hyperphysics.phy-astrgsu.edu/hbase/pertab/c.html#c1; Date: Sep. 30, 2004.

(Continued)

*Primary Examiner* — Patricia L Nordmeyer
(74) *Attorney, Agent, or Firm* — Avery Dennison Corporation

(57) ABSTRACT

An adhesive article exhibiting air release or egress, repositionability, and/or slidability characteristics. An adhesive article comprises an adhesive layer comprising an adhesive surface comprising discrete forms of non-adhesive material randomly distributed on the patterned surface and at least partially embedded in the adhesive layer. The discrete forms of non-adhesive material provide areas of no or minimal adhesion and provide the article with some level of repositionability or slidability. The adhesive surface comprising the non-adhesive forms may be patterned to provide an adhesive surface with a contact surface and recessed area or channels that provide the article with a route for air to flow out from under the construction. An article may be formed by providing a release liner, applying discrete forms of non-adhesive material to a surface of the release liner, at least partially embedding the non-adhesive forms, and embossing the release liner.

16 Claims, 3 Drawing Sheets

(56) References Cited

U.S. PATENT DOCUMENTS

| | | |
|---|---|---|
| 3,554,835 A | 1/1971 | Morgan |
| 3,565,750 A | 2/1971 | Evans |
| 3,802,947 A | 4/1974 | McQuade, Jr. |
| 4,054,697 A | 10/1977 | Reed et al. |
| 4,289,821 A | 9/1981 | Gray, III et al. |
| 4,306,928 A | 12/1981 | Okui |
| 4,322,450 A | 3/1982 | Gray, III et al. |
| 4,376,151 A | 3/1983 | Parrotta |
| 4,397,905 A | 8/1983 | Dettmer et al. |
| 4,425,176 A | 1/1984 | Shibano et al. |
| 4,427,732 A | 1/1984 | Gray, III et al. |
| 4,556,595 A | 12/1985 | Ochi |
| 4,576,597 A | 3/1986 | Hlaban |
| 4,582,534 A | 4/1986 | Torobin |
| 4,587,152 A | 5/1986 | Gleichenhagen et al. |
| 4,636,408 A | 1/1987 | Anthony et al. |
| 4,713,273 A | 12/1987 | Freedman |
| 4,721,638 A | 1/1988 | Matsuguchi et al. |
| 4,735,837 A | 4/1988 | Miyasaka et al. |
| 4,761,320 A | 8/1988 | Coburn, Jr. |
| 4,771,891 A | 9/1988 | Sorensen et al. |
| 4,889,234 A | 12/1989 | Sorensen et al. |
| 4,971,854 A | 11/1990 | Hinishi et al. |
| 5,008,139 A | 4/1991 | Ochi et al. |
| 5,112,890 A | 5/1992 | Behrens et al. |
| 5,141,790 A | 8/1992 | Calhoun et al. |
| 5,162,390 A | 11/1992 | Tilley et al. |
| 5,180,635 A | 1/1993 | Plamthottam et al. |
| 5,192,612 A | 3/1993 | Otter et al. |
| 5,194,299 A | 3/1993 | Fry |
| 5,268,228 A | 12/1993 | Orr |
| 5,273,805 A | 12/1993 | Calhoun et al. |
| 5,296,277 A | 3/1994 | Wilson et al. |
| 5,344,681 A | 9/1994 | Calhoun et al. |
| 5,344,693 A | 9/1994 | Sanders |
| 5,346,766 A | 9/1994 | Otter et al. |
| 5,362,516 A | 11/1994 | Wilson et al. |
| 5,369,140 A | 11/1994 | Valet et al. |
| 5,449,540 A | 9/1995 | Calhoun et al. |
| 5,462,765 A | 10/1995 | Calhoun et al. |
| 5,487,929 A | 1/1996 | Rusincovitch, Jr. et al. |
| 5,559,163 A | 9/1996 | Dawson et al. |
| 5,585,178 A | 12/1996 | Calhoun et al. |
| 5,589,246 A | 12/1996 | Calhoun et al. |
| 5,591,290 A | 1/1997 | Walter et al. |
| 5,650,215 A | 7/1997 | Mazurek et al. |
| 5,676,787 A | 10/1997 | Rusincovitch et al. |
| 5,731,073 A | 3/1998 | Knott et al. |
| 5,795,636 A | 8/1998 | Keller et al. |
| 5,853,862 A | 12/1998 | Murai et al. |
| 5,866,220 A | 2/1999 | Rusincovitch et al. |
| 5,897,930 A | 4/1999 | Calhoun et al. |
| 5,906,883 A | 5/1999 | Blanc-Brude |
| 5,915,731 A | 6/1999 | Jackson |
| 6,001,471 A | 12/1999 | Bries et al. |
| 6,024,824 A | 2/2000 | Krech |
| 6,083,616 A | 7/2000 | Dressler |
| 6,123,890 A | 9/2000 | Mazurek et al. |
| 6,197,397 B1 | 3/2001 | Sher et al. |
| 6,372,341 B1 | 4/2002 | Jung et al. |
| 6,524,675 B1 | 2/2003 | Mikami et al. |
| 6,565,697 B1 | 5/2003 | Maercklein |
| 6,630,049 B2 | 10/2003 | Hannington et al. |
| 6,838,142 B2 | 1/2005 | Yang et al. |
| 7,060,351 B2 | 6/2006 | Hannington |
| 2001/0052384 A1 | 12/2001 | Hannington |
| 2004/0213993 A1 | 10/2004 | Hannington |
| 2005/0039847 A1 | 2/2005 | Hannington et al. |

FOREIGN PATENT DOCUMENTS

| | | |
|---|---|---|
| EP | 0429269 | 5/1991 |
| EP | 0479223 | 4/1992 |
| EP | 0491099 | 6/1992 |
| EP | 0611055 | 8/1994 |
| EP | 1126002 | 8/2001 |
| GB | 1511060 | 5/1978 |
| GB | 1541311 | 2/1979 |
| JP | 53149259 | 12/1978 |
| JP | 5953787 | 3/1984 |
| JP | 59078285 | 5/1984 |
| JP | 61254334 | 11/1986 |
| JP | 03231981 | 10/1991 |
| JP | 05084825 | 4/1993 |
| JP | 5271629 | 5/1993 |
| JP | 06212131 | 8/1994 |
| JP | 09157612 | 6/1997 |
| WO | 9829516 | 7/1998 |
| WO | 9915600 | 4/1999 |
| WO | 9935201 | 7/1999 |
| WO | 0069985 | 11/2000 |
| WO | WO 0181080 A1 * | 11/2001 |

OTHER PUBLICATIONS

Abstract for JP 05084825, Dated Apr. 27, 2007.
Machine translation for JP 05084825, Dated Apr. 27, 2007.
Abstract for JP 06020043, Dated Jan. 28, 1994.
Abstract for JP 07019346, Dated Jan. 20, 1995.
List of Co-Pending and/or Related U.S. Applications and Patents, Dated Aug. 22, 2007.
Webpage for carbon atom: http://hyperphysics.phy-astr.gsu.edu/hbase/pertab/c.html#c1; Date: Sep. 30, 2004.
Concise Encyclopedia of Polymer Science and Engineering, pp. 902-903. Date and Publisher: 1990 by John Wiley & Sons, Inc.
PCT/US01/12958; PCT International Search Report mailed Sep. 4, 2001.
PCT/US01/12999; PCT International Search Report mailed Jul. 31, 2001.
PCT/US2005/045263; PCT International Search Report mailed Apr. 13, 2006.
Abstract for JP 05084825, Apr. 27, 2007.
Machine translation for JP 05084825, Apr. 27, 2007.
Abstract for JP 06020043, Jan. 28, 1994.
Abstract for JP 07019346, Jan. 20, 1995.
List of Co-Pending and/or Related U.S. Applications and Patents.

* cited by examiner

ADHESIVE ARTICLES HAVING REPOSITIONABILITY OR SLIDABILITY CHARACTERISTICS

TECHNICAL FIELD

The present invention relates to adhesive articles and methods of making the same. The adhesive articles may find usefulness in a variety of applications including, for example, advertising and promotion, screening and tinting, transportation, traffic and safety, labeling, industrial and graphic displays such as those used on vehicles and architectural surfaces.

BACKGROUND

Pressure sensitive adhesives have enjoyed great acceptance for their convenience of use. Pressure sensitive adhesives are used in a variety of applications including tapes, labels and articles containing graphic images. Pressure sensitive adhesives have a number of advantages such as strong bonding and simplicity of application. One drawback of these products is the initial tack of the pressure sensitive adhesive. A need exists to make pressure sensitive adhesives that are repositionable, yet have a high ultimate adhesion. Desirably, during application, the product may be moved or removed without destroying or disturbing the product or the substrate to which the material is being applied. When applying large graphics, for example, a need exists for the products to be able to slide. Slidability allows for proper alignment of the graphic during difficult applications.

When the product is a graphic image and is applied over an area like a wall or truck panel, there is the possibility of trapping air under the product and forming deformations of the surface such as with bubbles or wrinkles. These bubbles and wrinkles will distort and damage the graphic; therefore, it desirable for the product to exhibit air release or egress. Air egress is the ability of the product to provide a route for air trapped under the product to be removed.

A need exists in a variety of markets, such as the label and graphics market, for products that have one or more of the desirable properties of air egress, repositionability, and slidability.

SUMMARY

The present invention relates to an adhesive article that exhibits air release or egress, repositionability, and/or slidability characteristics. Air egress may be provided by an adhesive surface having a patterned topography comprising recessed areas such as, for example, grooves and channels. Repositionability and/or slidability may be provided by having discrete quantities of surface contact elements or non-adhesive material that are randomly distributed or provided in a non-regular arrangement on and partially embedded in the adhesive layer. The present invention further relates to methods of making such adhesive articles. Adhesive articles in accordance with the present invention may find usefulness as decals, labels, industrial graphic images and designs, decorative coverings, architectural displays and the like.

In one aspect, the present invention may relate to a method of making an adhesive article, the method comprising: providing a release liner having a release surface and a back surface; applying a plurality of surface contact elements or non-adhesive material forms to the release surface of the release surface such that the non-adhesive forms are distributed on the release surface in a non-regular arrangement; at least partially embedding one or more of the non-adhesive forms into the release liner; embossing the release liner to provide an embossed pattern; and applying an adhesive layer having a front surface and a back surface onto the release surface of the release liner, wherein the front surface of the adhesive layer is adhered to the release surface of the release liner. In one embodiment, the non-adhesive forms may be applied by spraying. Embedding and embossing may be carried out (i) separately and sequentially, or (ii) substantially simultaneously.

In another aspect the present invention may relate to an adhesive article comprising: an embossed release liner having a release surface and a back surface; an adhesive layer having a front surface and a back surface, the front surface of the adhesive being adhered to the release surface of the release liner; and a plurality of non-adhesive material forms randomly distributed about the release surface of the release liner, wherein at least one or more of the non-adhesive material forms are at least partially embedded into the release liner. The non-adhesive material may further have random or discrete forms, sizes, shapes, densities and/or configurations or be comprised of one or more chemical compounds.

In a further aspect, the present invention may relate to a method of forming an embossed carrier web, the method comprising: providing a carrier web having a first surface and a second surface; applying a non-adhesive material to the first surface of the carrier web to provide a plurality of non-adhesive material forms, the non-adhesive material being applied such that the non-adhesive material forms are randomly distributed on the first surface; at least partially embedding one or more of the non-adhesive material forms into the carrier web; and embossing the carrier web to provide an embossed pattern.

In a further aspect, the present invention may relate to a carrier web comprising: first and second opposing surfaces; and a plurality of non-adhesive material forms randomly distributed about at least one of the first and second opposing surfaces and at least partially embedded in the carrier web, wherein the carrier web has an embossed pattern in at least one of the first and second surfaces.

In still another aspect, the present invention may relate to a pressure sensitive graphical display, comprising; a substrate having first and second surfaces; indicia applied to the first surface of the substrate; an adhesive layer applied to the second surface of the substrate; a plurality of discrete non-adhesive material forms, some of which are at least partially embedded in the adhesive layer; a release liner covering the adhesive layer and the plurality of discrete non-adhesive material forms; and wherein the plurality of discrete non-adhesive material forms provide air egress channels in the adhesive layer.

In another aspect, the present invention may relate to a pressure sensitive graphical display, comprising; a substrate having first and second surfaces; indicia applied to the first surface of the substrate; an adhesive layer applied to the second surface of the substrate; a plurality of discrete non-adhesive material forms, some of which are at least partially embedded in the adhesive layer; a release liner covering the adhesive layer and the plurality of discrete non-adhesive material forms; and wherein the plurality of discrete non-adhesive material forms provide air egress channels in the adhesive layer.

In a further aspect, the present invention may relate to a method of making an adhesive article, the method comprising: providing a release liner having a release surface and a back surface; applying a plurality of non-adhesive forms comprising a non-adhesive material to the release surface of the release liner such that the non-adhesive forms are distributed on the release surface in a non-regular arrangement; at least partially embedding one or more of the non-adhesive forms into the release liner; and applying an adhesive layer having a front surface and a back surface onto the release surface of the release liner, wherein the front surface of the adhesive layer is adhered to the release surface of the release liner.

In another aspect, the present invention may relate to a method of making an adhesive article, the method comprising: providing a release liner having a release surface and a back surface; applying a plurality of surface contact elements to the release surface of the release liner such that the surface contact elements are distributed on the release surface in a non-regular arrangement; at least partially embedding one or more of the surface contact elements into the release liner; and applying an adhesive layer having a front surface and a back surface onto the release surface of the release liner, wherein the front surface of the adhesive layer is adhered to the release surface of the release liner.

In a further aspect, the present invention may relate to an adhesive article comprising: an embossed release liner having a release surface and a back surface; an adhesive layer having a front surface and a back surface, the front surface of the adhesive being adhered to the release surface of the release liner; and a plurality of surface contact elements randomly distributed about the release surface of the release liner, wherein one or more of the surface contact elements are at least partially embedded into the release liner.

These and other features of the present invention may be further understood from the following detailed description in conjunction with the drawings.

DETAILED DESCRIPTION

The present invention may relate to adhesive articles such as those used, for example, in industrial, advertising, promotional, labeling, vehicular, traffic and safety, architectural and transportation related graphics. The adhesive articles may provide one or more of air egress or release, repositionability, and/or slidability for easy application to a substrate. The present invention may also relate to methods of making such adhesive articles. Further, the present invention may relate to a carrier web or intermediate assembly, such as a release liner, that may be suitable for adhesive articles.

The adhesive articles may generally comprise an adhesive layer, and surface contact elements or non-adhesive material forms randomly distributed along a surface of the adhesive layer. The non-adhesive material may be dispersed in a particular or discrete volume, density, quantity or amount which can create a discontinuity in the number of particles provided across the surface. The adhesive layer may be patterned and comprise recessed areas, such as, for example, grooves, lanes or channels, in a surface of the adhesive layer. The recessed areas and/or channels or grooves provide the adhesive article with air egress characteristics, i.e., the recessed areas provide a route for trapped air under the product to be removed or released when the article is applied to a surface. Generally, the non-adhesive material will be disposed on the patterned surface of the adhesive layer. The adhesive article may comprise a release liner releasably adhered to a surface of the adhesive layer. Non-adhesive material is preferably non-tacky at a temperature of application but may develop adhesive or tacky properties upon application of temperature or pressure above certain thresholds.

Figure 1A:
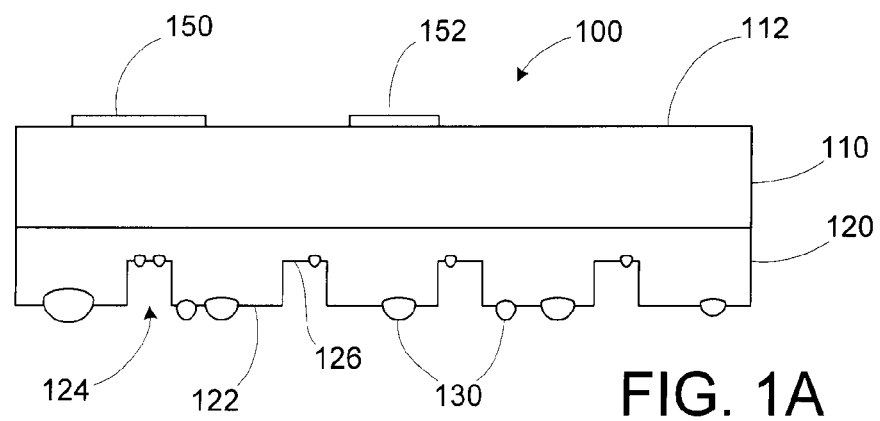
FIGS. 1A and 1B are cross-sectional views of an adhesive article having a patterned contact surface and non-adhesive forms disposed on the patterned surface.

With reference to FIG. 1A, adhesive article 100 comprises a substrate or facestock 110, an adhesive layer 120, and surface contact elements or non-adhesive forms 130. The non-adhesive forms comprise or are formed by a non-adhesive material. The non-adhesive forms 130 may also be referred herein as surface contact elements, discrete or individual non-adhesive forms, particles, dots, bits, pieces, segments, or the like. Adhesive 120 has a patterned surface 122 comprising recessed areas 124. Recessed areas 124 define a recessed surface 126. The adhesive article includes non-adhesive forms 130 in contact with the patterned surface of the adhesive. As shown in FIG. 1A, the non-adhesive forms 130 may be partially embedded in adhesive layer 120. For reasons described further herein, recessed areas including surfaces 126 of the adhesive layer may also be in contact with or have partially embedded therein non-adhesive forms 130. As shown in FIG. 1A, the non-adhesive forms 130 are distributed in or along the surface of adhesive layer 120 in a random or non-regular arrangement. In addition to being randomly distributed in or along the surface of the adhesive layer, the non-adhesive forms 130 may have random sizes, shapes, densities, configurations, or the like.

Figure 1B:
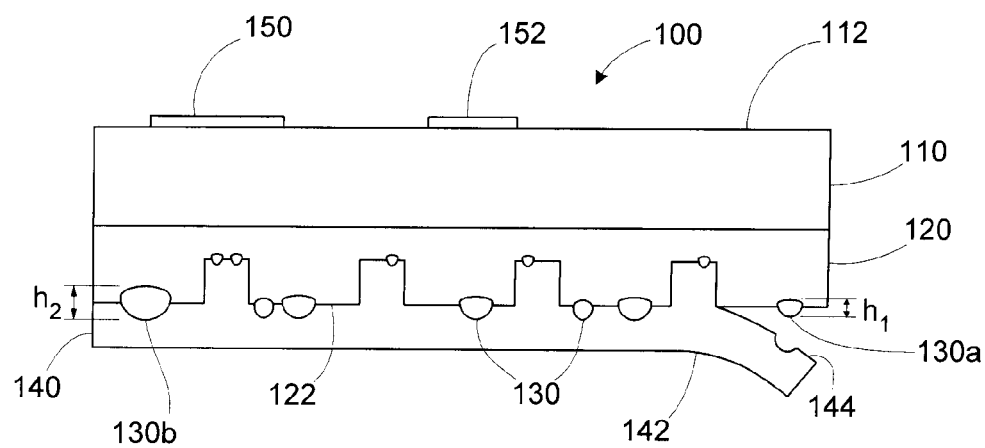

With reference to FIG. 1B, adhesive article 100 further comprises release liner 140. FIG. 1B shows release liner 140 partially peeled away from the adhesive layer 120. Release liner 140 includes an outer or back surface 142, and an inner surface 144 in contact with the adhesive layer 120. Inner surface 144 may also be referred to as the release surface. As shown in FIG. 1B, the non-adhesive material 130 is partially embedded in the release liner 140.

The non-adhesive forms 130 may provide adhesive article 100 with repositionability or slidability characteristics, which refers to the ability to move or change the position or orientation of the article 100 with respect to the substrate or surface to which it is to be applied. In one embodiment, the adhesive article may be placed on a substrate and the non-adhesive forms may prevent the adhesive surface 122 from completely or fully contacting and adhering to the substrate. In this manner the article can be placed on the substrate and slid over the surface of the substrate and into a selected position prior to adhering the article to the substrate. In another embodiment, the non-adhesive forms may provide the adhesive article with a lower initial tack such that the article may be repeatedly applied to and removed (i.e., repositioned) from the substrate without significantly compromising the adhesive properties of the article or damaging the substrate's surface. Further, the non-adhesive forms may provide the adhesive article with air egress characteristics. The channels 124 in adhesive article 100 may provide a route for trapped air under the article to be removed or released and, thus, may provide the article with air egress properties.

The adhesive article shown in FIGS. 1A and 1B is merely an exemplary embodiment of an adhesive article in accordance with the present invention. The adhesive article is not limited to such a configuration and may include other designs and/or configurations. It will be appreciated that the adhesive article may include other layers intermediate the adhesive layer and the facestock. It will also be appreciated that the adhesive article need not include a facestock, but may include, for example, a second release liner in place of the facestock for providing a double-sided configuration, such as a double-sided tape or a transfer tape, where the adhesive and one liner are used to transfer the adhesive to a face stock. Further, the adhesive may be formed such that both surfaces of the adhesive comprise areas of non-adhesive material.

In one embodiment, the non-adhesive material can be any material that upon drying, cooling, and/or curing is generally not tacky. The non-adhesive material may be made of organic polymeric material such as, for example, polyurethane, polyvinyl chloride, acrylic polymers, acetate, polyethylene, polypropylene or polystyrene and the like. In one embodiment, the non-adhesive material is an ink, such as a printing ink. The non-adhesive material may also include oils, pigment dispersions, agglomerations of particles, encapsulated materials or any other material that can be distributed using the methods contemplated in this invention.

In one embodiment, the non-adhesive forms may all be formed from the same non-adhesive material. In another embodiment, two or more sets of non-adhesive forms may be formed from different non-adhesive material compositions. For example, a first set of non-adhesive forms may be applied the release liner in a random or non-regular arrangement using a first non-adhesive material, and a second set of non-adhesive forms may be applied to the release liner in a random or non-regular arrangement using a second non-adhesive material. Of course, if desired, other sets of non-adhesive forms formed from additional non-adhesive materials may be employed.

In one embodiment, the non-adhesive material is a UV-curable ink. Ultraviolet radiation curable inks that are useful as the non-adhesive material may generally comprise a binder that includes one or more photopolymerizable monomers. The photopolymerizable monomers generally are ethylenically unsaturated compounds. The unsaturated compounds may contain one or more olefinic double bonds, and they may be low molecular weight compounds (monomeric), or high molecular weight compounds (oligomeric). Illustrative examples of monomers containing one double bond include acrylates such as alkyl(meth)acrylates or hydroxyalkyl(meth)acrylates such as methyl-, ethyl-, butyl-, 2-ethylhexyl- or 2-hydroxyethylacrylate, isobornylacrylate, methyl- or ethyl-methacrylate, and the like. Further examples of photopolymerizable monomers include acrylonitrile, acrylamide, methacrylamide, N-substituted(meth)acrylamides, vinyl esters such as vinyl acetate, vinyl ethers such as isobutylvinyl ether, styrene, alkylstyrenes and halostyrenes, N-vinylpyrrolidone, vinyl chloride, vinylidene chloride, and the like.

Suitable monomers containing a plurality of double bonds include, but are not limited to, the diacrylates of ethylene glycol, 1,3-propylene glycol, 1,4-butaneodiol, 1,4-cyclohexane diol, neopentyl glycol, hexamethylene glycol, or bisphenol A polyacrylates such as trimethylolpropane triacrylate and pentaerythritol triacrylate or tetraacrylate, vinyl acrylate, divinyl benzene, divinyl succinate, diallyl phthalate, triallylphosphate, triallylisocyanurate, tris(2-acryloyloxy)ethyl-isocyanurate, and the like.

Examples of suitable high molecular weight (oligomeric) polyunsaturated compounds include, but are not limited to, acrylated epoxy resins, acrylated polyethers, acrylated polyurethanes, acrylated polyesters, and the like. Further examples of suitable unsaturated oligomers include unsaturated polyester resins that are normally prepared from maleic acid, phthalic acid and one or more diols and which have molecular weights of about 500 to about 3000. Such unsaturated oligomers may also be referred as prepolymers. Single component systems based on photocurable prepolymers are often used as binders for printing inks. Unsaturated polyester resins are normally used in two-component systems together with a monounsaturated monomer such as described above, preferably with styrene.

The unsaturated compounds also can be used in admixture with non-photopolymerisable photopolymerisable film-forming components. These components may typically be drying polymers or their solutions in organic solvents, such as nitrocellulose. They may also, however, be chemically curable or thermocurable resins such as polyisocyanates, polyepoxides or melamine resins. The concomitant use of thermocurable resins is important for use in so-called hybrid systems which are photopolymerised in a first step and crosslinked by a thermal after treatment in a second step.

The UV radiation curable inks also should contain at least one photoinitiator. A wide range of different photoinitiators is at present available for UV radiation curable systems. They include benzophenone and benzophenone derivatives, benzoin ethers, benzil ketals, dialkoxyacetophenones, hydroxyacetophenones, aminoacetophenones, haloacetophenones or acryloxyphosphine oxides. They differ in that they have different absorption maxima. To cover a wide absorption range it is possible to use a mixture of two or more photoinitiators. The total amount of photoinitiator in the UV radiation curable compositions may be in the range of, for example, from about 0.05 to about 10% by weight of the total composition. In one embodiment, the compositions contain from about 0.2% to about 5% by weight of the photoinitiator.

Amines may be added to accelerate the photopolymerisation, for example triethanolamine, N-methyl-diethanolamine, p-dimethylaminobenzoate or Michler's ketone. The photopolymerisation can further be accelerated by the addition of photosensitisers that displace or broaden the spectral sensitivity. Suitable photosensitisers include aromatic carbonyl compounds such as thioxanthone, anthraquinone and 3-acyl-coumarin derivatives as well as 3-(aroylmethylene)-thiazolines.

Hindered amine light stabilizers (HALS) that function as co-stabilizers may also be added to UV radiation curable printing compositions used in the present invention. Examples of hindered amine light stabilizers include those listed and recited in U.S. Pat. Nos. 5,112,890 and 4,636,408, which are incorporated herein by reference. A specific example of a hinder amine light stabilizer useful in the printing inks is Tinuvin 292, which is identified as bis(1,2,2,6,6-pentamethyl-4-piperidinyl)-sebacate.

In addition to the above described binder materials and photoinitiators, the UV radiation curable inks used in the present invention may also contain coloring matter selected from organic pigments, inorganic pigments, body pigments and dyes, which are known and have been used in this art. Examples of useful pigments include, but are not limited to, titanium dioxide, cadmium yellow, cadmium red, cadmium maroon, black iron oxide, carbon black, chrome green, gold, silver, aluminum and copper. Examples of dyes include, but are not limited to, alizarine red, Prussian blue, auramin naphthol, malachite green, etc. Generally the concentration of the pigment or dye in the ink may be from about 0 to about 70% by weight, and in one embodiment, from about 0.1% to about 50% by weight.

In addition to the above described coloring matter, UV radiation curable inks suitable for use as the non-adhesive material may also contain fillers, extenders, surfactants, and the like, which are known and have been used in this art. Examples of useful fillers and extenders include, for example, silicon dioxide, fumed silica, glass or ceramic microspheres, and glass or ceramic bubbles. Generally the concentration of the filler or extender may be from about 0 to about 70% by weight, and in one embodiment, from about 0.5% to about 50% by weight.

Inks suitable for use as the non-adhesive material may also contain at least one UV absorber, which provides weathering protection and helps prevent microcracking. The amount of UV absorber included in, for example, the UV radiation curable ink should be maintained at a practical minimum since the presence of the UV absorber may increase the curing rate. A variety of UV absorbers are known and useful in the non-adhesive material including UV absorbers belonging to the group of photopolymerisable hydroxybenzophenones and photopolymerisable benzotriazoles. U.S. Pat. No. 5,369,140 describes a class of 2-hydroxyphenyl-s-triazines that are useful as UV absorbers for radiation curable systems. The triazines are effective for stabilizing cured films when exposed to sunlight over a long period of time, and these stabilizers do not interfere with UV radiation curing of the inks. The triazine UV absorbers are effective in amounts of from about 0.1 to about 2% by weight. The UV absorbers may be used in combination with other light stabilizers such as sterically hindered amines. The disclosure of the '140 patent is hereby incorporated by reference for its disclosure of such UV absorber combinations. U.S. Pat. Nos. 5,559,163 and 5,162,390 also describe UV absorbers that are useful in the inks of the non-adhesive material.

Examples of useful UV-curable inks include those available from Decochem under the trade designation Poly-Rad plastics, as well as UV-curable inks commercially available from Acheson and Dow Chemical Company.

In one embodiment of the invention, the ink used to form the non-adhesive material on the adhesive layer may be a coalescing ink. The ink does not efficiently wet out on the surface of the adhesive, but coalesces into smaller areas of ink with an increase in ink dot height.

In one embodiment of the invention, the ink used to form the non-adhesive material comprises a porous non-adhesive. The porous non-adhesive may have elastomeric properties, so that if it is compressed, it essentially returns to its original shape. For example the porous non-adhesive comprises an ink containing a blowing agent that causes the ink to expand, forming an open or closed cell, or combination thereof. The blowing agent is activated, for example, by the application of heat to the ink. Other examples of porous non-adhesives include suspensions of gas and/or particles in a binder. The porous non-adhesive is then embedded into the adhesive layer. The porous non-adhesive fills the depression created in the embedding step, resulting in a facestock layer having a smooth outer appearance.

As described more fully herein, the adhesive article may be formed by applying the non-adhesive material to a carrier web such as a release liner to provide non-adhesive forms that are randomly distributed or arranged in a non-regular manner on a surface of the carrier web, e.g., on the release surface of a release liner as discrete quantities of non-adhesive material. In one embodiment, while being distributed on the carrier web (e.g., release liner) in a non-regular or random arrangement, the non-adhesive forms may be similar or regular in terms of their physical parameters. In another embodiment, the non-adhesive forms may be random in one or more physical parameters including size, shape, thickness, height, width, circumference, density, volume of non-adhesive material, and the like. In one embodiment, the non-adhesive forms may be in the shape of droplets or microsheres and may, when residing on a surface of a carrier web, such as the release surface of the release liner, have the appearance of hemispheres or mountains.

The dimensions of the non-adhesive forms may be controlled to some extent by the method by which they are applied in the carrier web. As used herein, the height of a non-adhesive form is the distance from a base of the form to the peak or apex of the form. For example, referring back to FIG. 1B, non-adhesive form 130a may have a height $h_1$, and non-adhesive form 130b may have a height $h_2$. The height of the non-adhesive forms is not limited. In one embodiment, the non-adhesive forms, when applied to the release liner, may individually have a height of from about 1 to about 50 microns. In one embodiment, the non-adhesive forms may individually have a height from about 1 to 25 microns, and in another embodiment the non-adhesive forms may individually have a height from about 1 to about 15 microns. However, one of ordinary skill in the art will readily appreciate that the height of the non-adhesive forms may vary depending on the method by which the non-adhesive material is applied. For example, in one embodiment, where the non-adhesive material is applied by spraying, a first quantity of non-adhesive material may be deposited onto a second quantity of non-adhesive material to provide a relatively large non-adhesive form, which will yield a height greater than the desired height.

The coverage of non-adhesive material may be selected to provide a desired level of slidability or repositionability. The coverage of non-adhesive material may also be selected based on the composition of the adhesive. For example, greater coverage of non-adhesive material may be needed with extremely aggressive adhesives to provide a suitable level of slidability or repositionability. In one embodiment, the non-adhesive forms may cover from about 1 to about 75% of the total surface area of the release surface of the release liner. In one embodiment, the non-adhesive forms may cover from about 1 to about 50%, in another embodiment from about 1 to about 35%, in another embodiment from about 1 to about 20%, and in another embodiment from about 1 to about 10% of the total surface area of the release surface of the release liner. The non-adhesive material may also cover from about 1 to about 75%, in one embodiment from about 1 to about 50%, in one embodiment from about 1 to about 35%, in one embodiment from about 1 to about 20%, and in one embodiment from about 1 to about 10% of the total surface area of the surface of the adhesive layer. The non-adhesive material or surface contact elements may provide the adhesive article with repositionability and/or slidability characteristics by reducing the initial tack of the adhesive to the substrate. Without being bound to any particular theory, the non-adhesive material may reduce the initial tack of the adhesive to the substrate by reducing the surface area of the adhesive that is available to initially contact a substrate's surface. The non-adhesive material may reduce the initial tack such that (i) the adhesive article may be initially applied adhered to a substrate surface and removed therefrom without a substantial loss of adhesive properties and/or without damaging the substrate surface, and/or (ii) the article may be placed against a substrate without preadhering to the substrate such that the article may be slid over the substrate's surface into a selected position.

As described above, the adhesive article may comprise a facestock, an adhesive layer, a plurality of discrete quantities of non-adhesive material, and a release liner. The facestock may be any material suitable for such a layer including those that are useful for decorative or graphic image applications. The facestocks may have any desired thickness and may have, for example, a thickness from about 10 to about 300, or from about 25 to about 125 microns. Material suitable for the facestock include, but are not limited to, paper, polyolefins (linear or branched), polyamides, polystyrenes, nylon, polyesters, polyester copolymers, polyurethanes, polysulfones, polyvinylchloride, styrene-maleic anhydride copolymers, styrene-acrylonitrile copolymers, ionomers based on sodium or zinc salts of ethylene methacrylic acid, polymethyl methacrylates, cellulosics, fluoroplastics, acrylic polymers and copolymers, polycarbonates, polyacrylonitriles, and ethylene-vinyl acetate copolymers. Included in this group are acrylates such as ethylene methacrylic acid, ethylene methyl acrylate, ethylene acrylic acid and ethylene ethyl acrylate. Also, included in this group are polymers and copolymers of olefin monomers having, for example, 2 to about 12 carbon atoms, and in one embodiment 2 to about 8 carbon atoms. These include the polymers of alpha-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule. The polyethylenes that are useful have various densities including low, medium and high density ranges. The low density range is from about 0.910 to about 0.925 g/cm$^3$; the medium density range is from about 0.925 to about 0.940 g/cm$^3$; and the high density range is from about 0.94 to about 0.965 g/cm$^3$. Films prepared from blends of copolymers or blends of copolymers with homopolymers also are useful. The films may be extruded as a monolayer film or a multilayered film.

In one embodiment, the facestock is a polymeric facestock, which contains migratory additives. An exemplary facestock is a polyvinylchloride facestock. Such materials typically include additives such as plasticizers and antioxidants. The plasticizer is a high-boiling solvent or softening agent, usually liquid. It is an ester made from an anhydride or acid and a suitable alcohol that usually has between 6 to 13 carbon atoms. Suitable plasticizers include adipate, phosphate, benzoate or phthalate esters, polyalkylene oxides, sulfonamides, etc. Examples of plasticizers include, but are not limited to, DOA plasticizer (dioctyl adipate), TEG-EH plasticizer (triethylene glycol di-2-ethylhexanoate), TOTM plasticizer (trioctyl trimellitate), triacetin plasticizer (glyceryl triacetate), TXIB plasticizer (2,2,4-trimethyl-1,3-pentanediol diisobutyrate), DEP plasticizer (diethyl phthalate), DOTP plasticizer (dioctyl terephthalate), DMP plasticizer (dimethyl phthalate), DOP plasticizer (dioctyl phthalate), DBP plasticizer (dibutyl phthalate), polyethylene oxide, toluenesulfonamide, dipropylene glycol benzoate, and the like.

The facestock may be configured or shaped as desired for a particular purpose or intended use. The facestock may be a single layer or may comprise multiple layers. Multiple layers may be employed to provide protection, weatherability, printability or other characteristics to the adhesive article. Indicia or graphics, such as information, logos, designs, phrases, pictures, or the like may be applied to the substrate or facestock. In one embodiment, indicia may be applied by printing a surface of the substrate or facestock. For example, with reference to FIGS. 1A and 1B, facestock 110 may carry or have printed thereon indicia 150 and 152, which may depict writing, design(s), logo(s), picture(s), or other desired indicia. In one embodiment, indicia 150 and 152 may represent printed regions printed directly onto the surface 112 of facestock 110. The facestock may be printed prior to or after being applied to the adhesive. In another embodiment, indicia 150, 152 may be separate printed layers or laminates that are applied to surface 112 of the substrate or facestock. The separate layer(s) may be printed with an indicia prior to or after being laminated to the facestock. Other layers or laminates may be provided to cover or protect the indicia. For example, facestock 110 and indicia 150 and 152 in FIGS. 1A and 1B could be covered by other layers or laminates if desired.

The adhesive layer may be formed from any suitable adhesive material as desired for a particular purpose or intended use. In one embodiment, the adhesive layer comprises a pressure sensitive adhesive layer. In some applications, the adhesive may be a heat activated adhesive, as distinguished from a pressure sensitive adhesive. The pressure-sensitive adhesive can be any pressure sensitive adhesive now known in the art or later discovered. These include rubber based adhesives, acrylic adhesives, vinyl ether adhesives, silicone adhesives, and mixtures of two or more thereof. Included are the pressure sensitive adhesive materials described in "Adhesion and Bonding", *Encyclopedia of Polymer Science and Engineering*, Vol. 1, pages 476-546, Interscience Publishers, 2nd Ed. 1985, the disclosure of which is hereby incorporated by reference. The pressure sensitive adhesive materials that are useful may contain as a major constituent an adhesive polymer such as acrylic type polymers, block copolymers, natural, reclaimed or styrene butadiene rubbers, tackified natural or synthetic rubbers, random copolymers of ethylene and vinyl acetate, ethylene-vinyl-acrylic terpolymers, polyisobutylene, poly(vinyl ether), etc. The pressure sensitive adhesive materials are typically characterized by glass transition temperatures in the range of about −70° C. to about 10° C.

Other materials in addition to the foregoing resins may be included in the pressure sensitive adhesive materials. These include solid tackifying resins, liquid tackifiers (often referred to as plasticizers), antioxidants, fillers, pigments, waxes, etc. The adhesive materials may contain a blend of solid tackifying resins and liquid tackifying resins (or liquid plasticizers). Particularly useful adhesives are described in U.S. Pat. Nos. 5,192,612 and 5,346,766, which are incorporated herein by reference.

The adhesive layer may have a thickness as desired for a particular purpose or intended use. In one embodiment, the adhesive layer may have a thickness from about 10 to about 125, or from about 10 to about 75, or from about 10 to about 50 microns. In one embodiment, the coat weight of the pressure sensitive adhesive may be in the range of about 10 to about 50 grams per square meter (gsm), and in one embodiment about 20 to about 35 gsm.

The construction of the adhesive layer is not limited and may be any suitable construction or configuration as desired for a particular purpose or intended use. For example, in one embodiment, the adhesive layer may be a single layer construction. In another embodiment, the adhesive layer may be a multi-layer construction comprising two or more adhesive layers. In one embodiment, the adhesive layer(s) may also be substantially continuous. In another embodiment, the adhesive layer(s) may be provided as a discontinuous layer or layers.

Release liners for use in the present invention may be those known in the art or those later discovered. In general, suitable release liners include, but are not limited to, polyethylene coated papers with a commercial silicone release coating, polyethylene coated polyethylene terephthalate films with a commercial silicone release coating, or cast polypropylene films that can be embossed with a pattern or patterns while making such films, and thereafter coated with a commercial silicone release coating. An exemplary release liner is kraft paper which has a coating of low density polyethylene on the front side with a silicone release coating and a coating of high density polyethylene or polypropylene on the back side. Other release liners known in the art are also suitable as long as they are selected for their release characteristics relative to the pressure sensitive adhesive chosen for use in the adhesive article, that is, the adhesive will have a greater affinity for the face stock than the liner. In one embodiment, the release liner has a moldable layer of polymer under the release coating. The moldable layer is typically a polyolefin, such as polyethylene or polypropylene. The surface of the release layer of the release liner may have a textured finish, a smooth finish, or a patterned finish. The release layer may have a randomly microstructured surface such as a matte finish, or have a pattern of three-dimensional microstructures. The microstructures may have a cross-section which is made up of circles, ovals, diamonds, squares, rectangles, triangles, polygons, lines or irregular shapes, when the cross-section is taken parallel to the surface of the release surface.

In one embodiment, the release liner has a release coating on both sides; one side having a release coating of a higher release value than the release coating of the other side.

In one embodiment, the adhesive layer of the articles has a Sheffield roughness of at least about 10 or at least about 75, or at least about 150. The adhesive layer may itself have the roughness or may be formed when the adhesive is coated onto a release liner. It is understood that the release liner may have a Sheffield roughness at least about 10 or at least about 50, or at least about 75 or at least about 150. The adhesive will replicate the complementary texture or pattern of the release liner. Alternatively, the release liner can be much rougher depending on the configuration of the adhesive article. The Sheffield roughness is determined by TAPPI T 538 om-88.

An adhesive article in accordance with the present invention may be formed by applying an adhesive material to an embossed carrier web, such as an embossed release liner, comprising non-adhesive forms, some of which are at least partially embedded in a surface of the carrier web. An embossed carrier web such as a release liner may be provided by (i) applying a non-adhesive material to a surface of a carrier web such that quantities of non-adhesive material are randomly distributed as non-adhesive forms on a surface of the carrier web, (ii) at least partially embedding one or more of the non-adhesive forms in the carrier web, and (iii) embossing the carrier web to create an embossed pattern. Upon removing the release liner, the adhesive layer has a patterned configuration or topography comprising recessed areas and quantities of non-adhesive material randomly distributed along and/or partially embedded in the surface of the adhesive layer. In one aspect, upon removal of the release liner, the adhesive layer may serve to extract some or all of the non-adhesive forms from the release liner. The adhesive article may further contain other layers as desired for a particular purpose or intended use such as, for example, a facestock, second release liner, or the like.

The non-adhesive material may be applied to a surface of the carrier web, such as a release liner, by any suitable method to randomly distribute quantities of the non-adhesive material on a surface of the release liner to provide a plurality of non-adhesive forms. The non-adhesive material may be applied to the release liner by, for example, brushing, spraying, printing, or the like. In one embodiment, the non-adhesive material is applied to the release liner by spraying. Spraying may be accomplished by using a spray gun such as an electrostatic spray gun and/or atomizer. An example of a suitable spray gun includes an AEROBELL DEVILBISS rotary atomizer available from ITW Ransberg Electrostatic Systems. Generally, spray guns include an atomizer housing and a rotating bell or cap spaced from one end of the atomizer housing. The atomizer housing includes rotary turbine engine blades and feed conduits for a solution such as a non-adhesive material. The non-adhesive material is expelled through injection ports at the end of the atomizer housing against the rotating bell or cap, which atomizes the solution and directs a charged or uncharged spray radially outward from the atomizer. The solution is atomized into discrete particles or droplets of various dimensions. Generally, the type of sprayer or spraying system used to apply the non-adhesive material is not limited. Other suitable sprayers include, but are not limited to, high volume, low pressure (HVLP) sprayers.

In one embodiment, the non-adhesive material is applied to a release liner by spraying from a sprayer such as a spray gun. In one embodiment, the spray gun may be attached to a mechanism, such as a robotic arm, and the sprayer may be moved relative to a stationary web of liner material. In another embodiment, the sprayer may be fixed in place and the non-adhesive material may be applied by spraying the material onto a moving web of liner material.

At least one or more of the non-adhesive forms may be at least partially embedded into the release liner. Generally, at least a portion of at least one or more of the non-adhesive forms are exposed and lie above the plane of the release liner. It will be appreciated that some of the non-adhesive forms may be "fully" embedded into the release liner such that the upper surface of one or more of the non-adhesive forms may be substantially even with or slightly below the plane of the release liner.

Embedding the non-adhesive material into the release liner may be carried out by any suitable method using various tools including, for example, pressure rollers or a platen. In one embodiment, embedding may be carried out by using pressure and/or a heated embedding tool. In one embodiment, the release liner may comprise a moldable layer of polymer under a release coating, which softens upon the application of heat and allows the non-adhesive material to be embedded into the liner. The moldable layer may typically be a polyolefin such as, for example, polyethylene. The embedding temperature and/or pressure may be selected based on (i) the materials used for the release liner and/or the non-adhesive material, and/or (ii) the method or tools used to at least partially embed the non-adhesive material. In one embodiment, the embedding temperature may be in the range of about 45° F. to about 300° F. In another embodiment, the embedding temperature may be in the range of about 200° F. to about 250° F. In one embodiment, the embedding pressure may be in the range of about 25 to about 150 pounds per square inch (psi). In one embodiment employing pressure rollers, the embedding nip pressure may be in the range of about 50 to about 140 psi.

The release liner may be embossed to create a pattern of depressions by contacting a surface of the release liner with a patterned embossing tool. In one embodiment, embossing is accomplished by contacting the release surface of the release liner with an embossing tool. The release liner may be embossed by any suitable method including using pressure rollers, a platen, a printing plate, or the like. An embossing tool generally includes a topographical pattern, which may be selected to provide a desired adhesive pattern with recesses or channels for air egress. Generally, when the embossing tool contacts the release surface of the release liner, it imparts the inverse of the tool's pattern onto the liner. That is, the patterned topography on the embossing tool is an obverse image of the final topography of the adhesive. The liner serves as the inverse image for transferring the image on the embossing tool to the adhesive. Thus, the embossing tool's topography is essentially the topography of the resulting adhesive layer. While embossing accomplished by pressure is generally preferred, other embossing techniques may be used such as by thermal embossing.

The patterns may be formed of any size, shape, and/or depth, as desired to provide a release liner and eventually an adhesive layer of a desired topography. The pattern may comprise a pattern of geometrical shapes including, but not limited to, circles, ovals, triangles, squares, rectangles, diamonds, trapezoids, pentagons, hexagons, heptagons, octagons, and the like. The pattern may also comprise decorative shapes other than conventional, regular geometric shapes. The pattern may comprise a regular pattern using one repeating shape of the same size and dimensions. Alternatively, the pattern may include an array of a selected shape, e.g., a hexagon, using shapes of different sizes or depths. The pattern may employ two or more different shapes. Even further, the topography may be a random or irregular configuration.

Precision of topographical formation of the release liner can be achieved using a variety of machining techniques, which are within the skill of those in the machine tool industry. Suitable tools include planar presses, cylindrical drums, or presses or drums of other curvilinear shapes. More specific examples of suitable tools include photolithographic printing plates and cylinders, precision engraved plates and cylinders, laser machined plates and cylinders, and the like.

During embossing, the embossing tool may be heated in order to set the embossed shape in the liner web. The temperature may be selected based on the materials used in the release liner. In one embodiment, the embossing tool has a temperature of, for example, about 45° F. to about 300° F. during embossing. In another embodiment, the embossing tool may have a temperature of about 45° F. to about 225° F., and in another embodiment from about 60° F. to about 80° F.

It will be appreciated that other steps may be employed in a process of forming an adhesive article as described herein. For example, if necessary, the method may further comprise drying and/or curing the non-adhesive material prior to embedding and/or embossing. The method may also include heating the non-adhesive material and release liner prior to embedding the non-adhesive material into the release liner and/or embossing the release liner.

In one embodiment, embedding the discrete quantities of non-adhesive material into the release liner and embossing the release liner may be carried out separately and sequentially. In another embodiment, embedding and embossing may be carried out substantially simultaneously.

Figure 2:
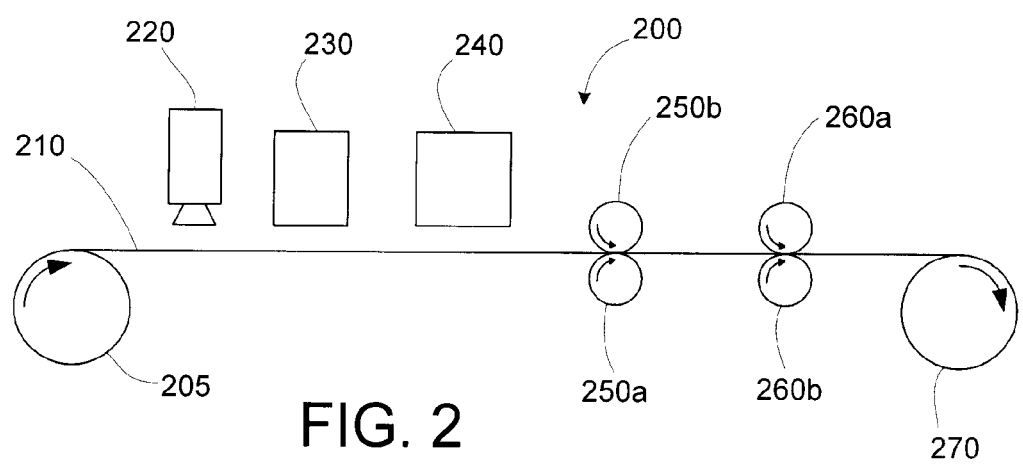
FIG. 2 is a schematic representation of a system for forming an embossed liner comprising non-adhesive forms embedded therein.

With reference to FIG. 2, for example, a schematic representation of a process that sequentially embeds the non-adhesive material and embosses the liner is shown. As shown in FIG. 2, a process system 200 may include forming an adhesive article by providing a moving web of a liner 210 from a roller 205, applying discrete quantities of non-adhesive material to the liner via sprayer 220, and drying and/or curing the non-adhesive material with drying and/or curing unit 230. After drying and/or curing the non-adhesive material, the liner web comprising the non-adhesive material is then heated with heater 240 and passed through rollers 250a, 250b, which at least partially embed the non-adhesive material into the release liner. Roller 250b may be an embedding roller formed of a relatively hard material, and roller 250a may be a back-up roller formed from a softer material than the embedding roller. Roller 250a may be, for example, formed from a rubber material. The web with the embedded non-adhesive material is then passed along to rollers 260a, 260b, for embossing. Roller 260a includes a patterned topography, the inverse image of which is imparted to the release liner. The embedding rollers and/or the embossing rollers may be heated to soften the release coating and underlying polymer layer and facilitate the embedding and/or embossing process. The liner may be wound on roll 270 and stored before further processing. Of course, it is not necessary to wind the liner prior to further processing, but the web could be continuously fed to another station for applying the adhesive layer.

It may be desirable for the release surface to be heated prior to embossing such that the release surface and/or polymer layer(s) are sufficiently softened to achieve a more complete embossing. In one embodiment, the heat of the release liner may be maintained prior to embossing by heating roller 250b and/or roller 250a. Rollers 250a and/or 250b may be, for example, heated to a temperature of about 45° F. to about 300° F.

In another embodiment, the embedding rollers may be "cold" or at a temperature such that the temperature of the release liner is cooled or not sufficiently elevated prior to embossing. In such a "cold" embedding process, it may be desirable to heat the release surface after the embedding process and prior to embossing. This may be accomplished by a heating unit located intermediate the embedding tool(s) and the embossing tool(s). For example, in the process schematic in FIG. 2, a heating unit (not shown) could be located intermediate embedding rollers 250a/250b and embossing rollers 260a/260b.

Figure 3:
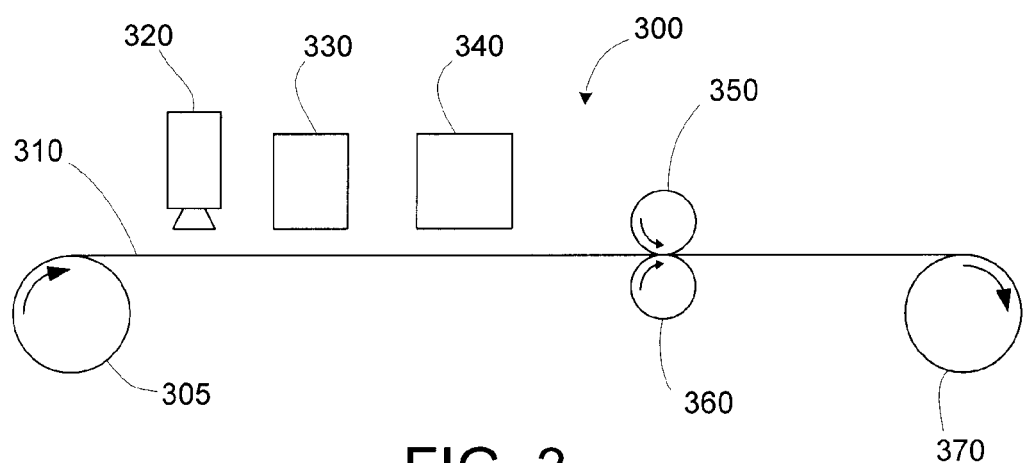
FIG. 3 is a schematic representation of a system for forming an embossed liner comprising discrete quantities of non-adhesive material embedded therein, wherein embossing and embedding are carried out substantially simultaneously.

With reference to FIG. 3, a schematic process is shown in which embedding the non-adhesive material and embossing the release liner are carried out substantially simultaneously. In process system 300 of FIG. 3, discrete quantities of a non-adhesive material are applied to a moving web 310 (from roll 305) of a release liner using sprayer 320. The non-adhesive material is dried and/or cured using dryer and/or curing unit 330. The non-adhesive material and the release liner are heated using heater 340 and passed along to rollers 350 and 360. In the embodiment in FIG. 3, roller 350 is an embossing roller and roller 360 is a backup roller, which may be a rubber backup roller. The backup roller 360 may be heated, in one embodiment, to a temperature of about 225° F. The embossing roller 350 has a topographical pattern on its surface. The embossing roller may also be temperature controlled such as, for example at a temperature from about 45° F. to about 225° F., in one embodiment from about 45° F. to about 90° F., and in one embodiment from about 60° F. to about 80° F. While the embossing rollers may be controlled or maintained at a selected temperature, it will be appreciated that the rollers may be heated or cooled as desired. When the embossing roller 350 contacts the front or release surface of the release liner, it imparts the inverse of the roller pattern onto the release liner. During embossing, the non-adhesive material is at least partially embedded into the release liner. The embossed liner may then be wound on roll 370. As previously described, the embossed liner need not be wound prior to further processing, such as, for example, prior to applying an adhesive layer to the release surface.

While the process has been described with respect to embossing the release liner by embossing the release surface of the release liner, it will be appreciated that it may be possible to form an embossed pattern by embossing the outer or back side (i.e., the side opposite the release surface) of the release liner.

It will be further appreciated that embossing may be accomplished after application of an adhesive layer to the release liner. For example, a method of forming an adhesive article may comprise (a) applying discrete quantities of a non-adhesive material to the release surface of the release liner such that the discrete quantities of non-adhesive material are randomly distributed on the release surface, (b) at least partially embedding one or more of the discrete quantities of non-adhesive material into the release liner, (c) applying an adhesive layer onto the release surface of the release layer, and (d) embossing the article.

Figure 4:
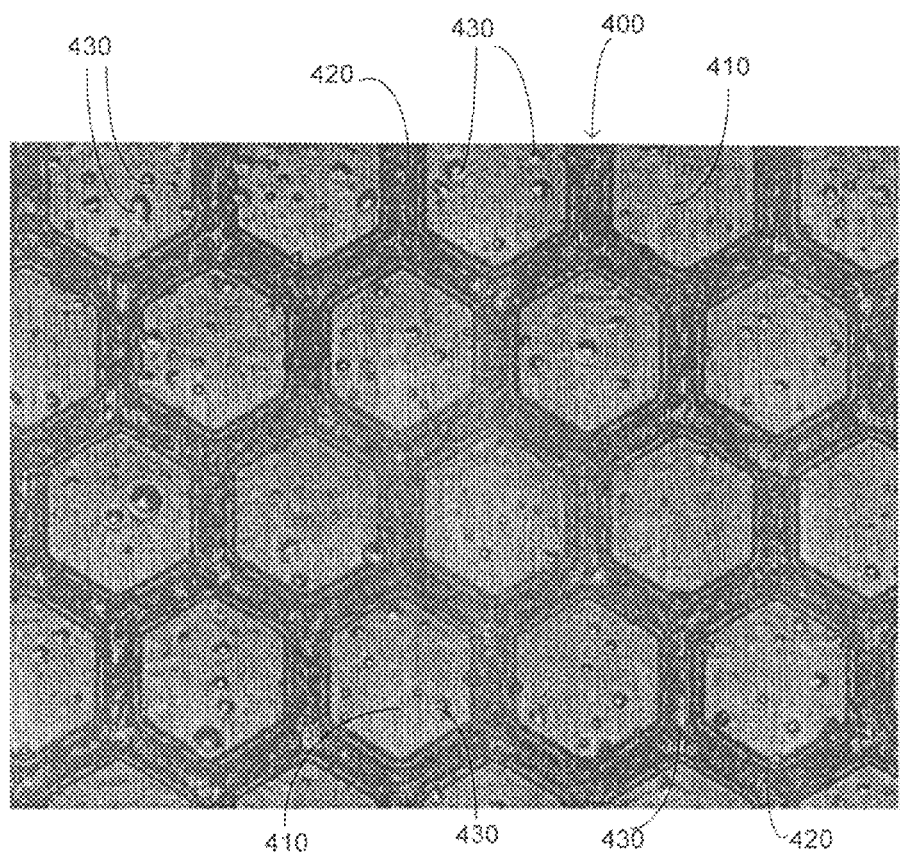
FIG. 4 is a micrograph of a section of an embossed release liner having discrete quantities of non-adhesive material embedded therein.

With reference to FIG. 4, an embossed liner having non-adhesive material embedded therein is shown. FIG. 4 depicts the release surface of the release liner. In FIG. 4, liner 400 includes a pattern of recessed areas 410 (i.e., extending into or below the plane of the paper), land areas 420 between adjacent recessed areas, and discrete quantities of non-adhesive material (or non-adhesive forms) 430 embedded in the surface of the liner. The discrete quantities of non-adhesive material 430 are partially embedded in the hexagonal recess and the land areas of the release liner. The portion of the non-adhesive material that is viewable in FIG. 4 extends above the plane of the surface in which it is embedded (i.e., above the surface of the recessed surface of hexagonal recesses 410 or the surface of land areas 420).

The adhesive layer can be applied using any suitable method including standard coating techniques, such as curtain coating, gravure coating, reverse gravure coating, offset gravure coating, roller coating, brushing, knife-over roll coating, air knife coating, metering rod coating, reverse roll coating, doctor knife coating, dipping, die coating, pattern bar coating, spraying, and the like. The application of these coating techniques is well known in the industry and can effectively be implemented by one skilled in the art. The knowledge and expertise of the manufacturing facility applying the coating determine the preferred method. Further information on coating methods can be found in "Modern Coating and Drying Technology", by Edward Cohen and Edgar Gutoff, VCH Publishers, Inc., 1992.

Upon formation of the adhesive layer, the adhesive layer is formed over and about the portions of the non-adhesive material lying above the plane of the release surface of the release liner such that the non-adhesive material is partially embedded in the adhesive layer. Referring back to FIG. 4, when an adhesive layer is applied over the release surface, the adhesive material would fill recessed areas 410, and the resulting adhesive layer would have topography that is the inverse of liner 400 and have a contact surface provided by protruding hexagonal areas separated by channels or recesses. Upon removal of the release liner, and referring back to FIG. 1A, the non-adhesive material (such as non-adhesive forms 130) remains embedded in the adhesive layer (such as adhesive layer 120), with a portion of the non-adhesive material being exposed or extending from the surface of the adhesive layer. Even if some non-adhesive forms may be "fully" embedded in the release liner, the bond strength between the adhesive and the non-adhesive material may be sufficient for the non-adhesive form to be bound to the adhesive layer upon removal of the release liner. The recesses or channels (such as recesses 124) in the patterned adhesive layer provide the adhesive article with air egress characteristics. The exposed, discrete quantities of non-adhesive material facilitate repositionability and/or slidability of the article when it is applied to a substrate.

A facestock or other suitable layer(s) may then be sequentially applied to the adhesive layer as desired to produce a desired adhesive article. The facestock or other layer(s) may be applied using any suitable method including, for example, laminating the layer to the adhesive layer.

An adhesive article may be applied to a substrate as desired. Generally, the release liner may be peeled away from the adhesive layer to expose the embossed adhesive surface comprising discrete quantities of non-adhesive material. As previously described herein, the adhesive surface may have a relatively low initial tack to allow the adhesive article to be (i) placed on the substrate without pre-adhering to the substrate and then slid or moved over the substrate's surface, or (ii) initially adhered to the substrate and subsequently removed from the substrate and repositioned. Once the article properly aligned or located as desired, the user may apply a force to secure the article to the substrate. The force required to secure the article to the substrate may be greater than that required to secure or adhere a similar adhesive material devoid of any non-adhesive forms.

Figure 5:
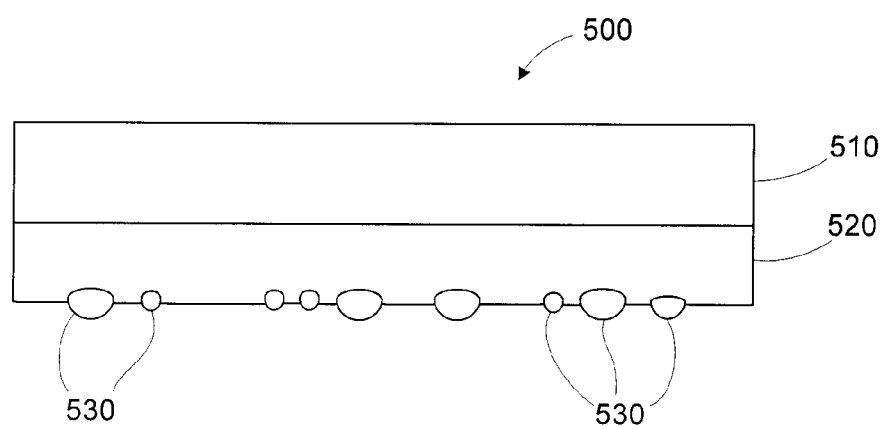
FIG. 5 is a cross-sectional view of an embodiment of an adhesive article having non-adhesive forms disposed on the contact surface of the adhesive.

While an adhesive article has been described with respect to an article having an embossed release liner and an embossed adhesive layer, it will be appreciated that the present invention is not limited to such a configuration. With reference to FIG. 5, for example, an adhesive article 500 may comprise substrate or facestock 510, adhesive layer 520, and non-adhesive forms 530. Similar to other embodiments, non-adhesive forms 530 are distributed in a random or non-regular arrangement on the adhesive layer, and at least one or more of the non-adhesive forms 530 are at least partially embedded in the adhesive layer. In the embodiment illustrated in FIG. 5, however, the adhesive layer is not embossed. The non-adhesive forms 530 may provide repositionability or slidability characteristics, and may optionally provide the article with air egress characteristics.

An adhesive article having a non-embossed adhesive layer, as illustrated, for example, in FIG. 5, may be formed by (i) providing a carrier web such as a release liner, (ii) applying a plurality of non-adhesive forms comprising a non-adhesive material to a surface of the carrier web (such as a release surface of a release liner) such that the non-adhesive forms are distributed in a non-regular arrangement, (iii) at least partially embedding one or more of the non-adhesive forms into the carrier web, and (iv) applying an adhesive layer onto the surface of the carrier web comprising the non-adhesive forms. The method may employ techniques such as those previously described herein with exception that the web or article are not subjected to an embossing step.

While the invention has been described in relation to various exemplary embodiments, it is to be understood that various modifications and equivalent arrangements thereof may become apparent to those skilled in the art upon reading the specification. The features of the various embodiments of the adhesive articles described herein may be combined into or within an adhesive article. The various methods of manufacturing the adhesive articles of the present invention described herein may also be combined. Therefore, it to be understood that the invention disclosed herein is intended to cover such modifications as fall within the scope of the appended claims which scope is to be accorded the broadest interpretation so as to encompass all equivalent structures and products.

The invention claimed is:

1. An adhesive article comprising:
an embossed release liner having a release surface and a back surface;
an embossed adhesive layer having a front surface and a back surface, the front surface of the adhesive being adhered to the release surface of the release liner and wherein a second release liner is adhered to the back surface of the adhesive layer, the front surface containing recessed areas and the recessed areas define a plurality of recessed surfaces; and
a plurality of surface contact elements randomly distributed about the release surface of the release liner, wherein one or more of the surface contacts are at least partially embedded within the recessed areas and wherein one or more of the surface contact elements are at least partially embedded into the release liner; and wherein the surface contact element forms are random in one or more physical parameters selected from a group including size, shape, thickness, height, width, circumference, density, volume and combinations thereof.

2. An adhesive article comprising:
an embossed release liner having a release surface having a plane and a back surface;
an adhesive layer having a patterned front surface containing recessed areas and a back surface, the recessed areas define a plurality of recessed surfaces;
the patterned front surface of the adhesive being adhered to the release surface of the release liner wherein a second release liner is adhered to the back surface of the adhesive layer; and
a plurality of non-adhesive material forms randomly distributed about the release surface of the release liner, wherein one or more of the non-adhesive forms are at least partially embedded into the release liner and one or more of the non-adhesive forms are at least partially embedded within the recessed areas;
the recessed areas are routes for air egress; and
at least a portion of the non-adhesive material forms are exposed and lie above the plane of the release surface
wherein the recessed areas are at least one of grooves, lanes and channels.

3. The adhesive article according to claim 2, wherein at least one of the non-adhesive material forms is at least partially embedded in the adhesive layer.

4. The adhesive article according to claim 2, wherein the non-adhesive material forms individually have a height of about 1 to about 50 microns.

5. The adhesive article according to claim 2, wherein the non-adhesive material comprises at least one UV-curable ink.

6. The adhesive article according to claim 2, wherein the non-adhesive material comprises at least one coalescing ink.

7. The adhesive article according to claim 2, wherein, upon removal of the release liner, the adhesive layer comprises at least one non-adhesive material form.

8. An adhesive article according to claim 2, wherein the non-adhesive material forms are random in one or more physical parameters selected from a group including size, shape, thickness, height, width, circumference, density, volume and combinations thereof.

9. The adhesive article of claim 2, wherein the non-adhesive material forms are at least partially embedded in the plurality of recessed surfaces.

10. The adhesive article of claim 2, further comprising a plurality of non-adhesive material forms randomly distributed about the second release liner, and wherein one or more of the non-adhesive forms are at least partially embedded into the second release liner.

11. The adhesive article of claim 2, wherein the embossed release liner topography is an obverse image of the final topography of the adhesive layer.

12. The adhesive article of claim 11, wherein the topography of the embossed release liner and topography of the adhesive layer are patterned.

13. The adhesive article of claim 12, wherein the pattern is a geometrical shape.

14. The adhesive article of claim 13, wherein the geometrical shape is selected from the group consisting of circles, ovals, triangles, squares, rectangles, diamonds, trapezoids, pentagons, hexagons, heptagons, octagons, and combinations thereof.

15. A pressure sensitive graphical display, comprising;
a substrate having first and second surfaces;
indicia applied to the first surface of the substrate;
an embossed adhesive layer with a patterned front surface having recessed surfaces and a back surface applied to the second surface of the substrate, the recessed areas define a plurality of recessed surfaces;
a plurality of discrete non-adhesive material forms distributed in a non-regular arrangement, some of which are at least partially embedded in the adhesive layer and one or more of the non-adhesive forms are at least partially embedded within the recessed areas;
a release liner covering the front surface of the adhesive layer and the plurality of discrete non-adhesive material forms and a second release liner covering the back surface of the adhesive layer;
wherein the plurality of discrete non-adhesive material forms provide air egress in the adhesive layer; and
wherein the recessed areas are at least one of grooves, lanes and channels.

16. A pressure sensitive label, comprising;
a substrate having first and second surfaces;
indicia applied to the first surface of the substrate;
an adhesive layer applied to the second surface of the substrate, the adhesive layer having a front surface containing recessed areas and a back surface, the recessed areas define a plurality of recessed surfaces;
the recessed areas are routes for air egress;
a plurality of discrete non-adhesive material forms randomly distributed, some of which are at least partially embedded in the adhesive layer and one or more of the non-adhesive forms are at least partially embedded within the recessed areas;
a release liner covering the front surface of the adhesive layer and the plurality of discrete non-adhesive material;
wherein the non-adhesive material forms are random in one or more physical parameters selected from a group including size, shape, thickness, height, width, circumference, density, volume and combinations thereof; and
wherein the plurality of discrete non-adhesive material forms and recessed areas provide air egress in the adhesive layer; and
wherein the recessed areas are at least one of grooves, lanes and channels.

* * * * *